3,080,429
Patented Mar. 5, 1963

3,080,429
PREPARATION OF HALOCARBON HAVING THE EMPIRICAL FORMULA C₁₀Cl₄F₁₄
Charles F. Baranauckas and Samuel Gelfand, Niagara Falls, N.Y., assignors to Hooker Chemical Corporation, Niagara Falls, N.Y., a corporation of New York
No Drawing. Filed Nov. 29, 1957, Ser. No. 699,519
1 Claim. (Cl. 260—648)

This invention relates to a new and useful chemical compound composed of carbon, chlorine and fluorine, i.e. a halocarbon having an empirical formula $C_{10}Cl_4F_{14}$ and a distillation range of about 220 to 235 degrees centigrade.

The compound of this invention may be prepared by fluorinating a halocarbon compound having an empirical formula $C_{10}Cl_4F_8$ and a melting point of about 74 to 75 degrees centigrade with cobalt trifluoride at an elevated temperature, and recovering the $C_{10}Cl_4F_{14}$ so produced.

In preparing the product of this invention, presumably one of the paths that the reaction can take is illustrated in accordance with the following equations:

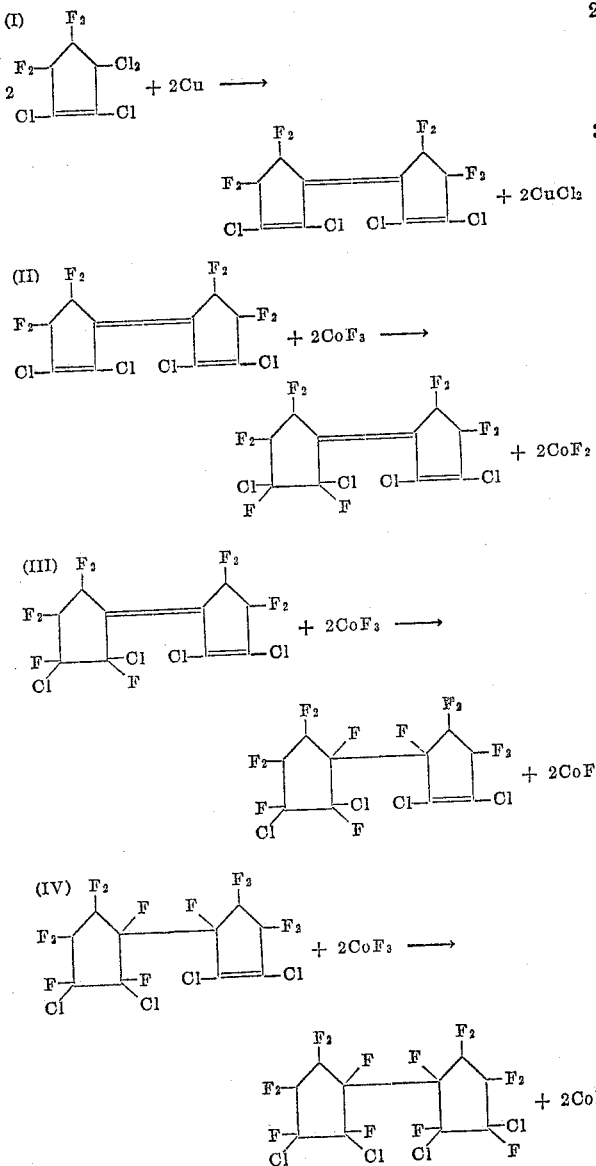

It is understood that there are other possible routes by which the final product can be attained, as for example, wherein the addition of the first two fluorine atoms to the starting material in Equation II is illustrated as a 1,2-addition to a terminal double bond of a triene system, it is also possible to have a 1,2-addition to the middle double bond of the triene system. In addition it is also possible to have a 1,4-addition across conjugated double bonds of the triene system. Thus it is possible to illustrate the chemical processes involved in Equations II through IV by the following general equation:

(V)  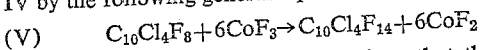

To those skilled in the art it is obvious that there are a number of stereoisomers theoretically possible for the $C_{10}Cl_4F_{14}$ of this invention.

The starting material, $C_{10}Cl_4F_8$, and cobalt trifluoride are mixed and heated to an eleavted temperature, wherein the brown cobalt trifluoride changes in color from brown to pink. Additional quantities of cobalt trifluoride are added until such time as there is no color change from brown to pink or until the reaction mixture becomes difficult to agitate because of the high percentage of solids present. The spent cobalt salts are removed by filtration followed by subsequent extraction with carbon tetrachloride and recovery of the organic from the carbon tetrachloride extract. The filtrate and the recovered material from the carbon tetrachloride extract are combined and retreated with cobalt trifluoride until the fluorinating agent fails to turn in color from brown to pink. The recovered product from the reaction mixture is a colorless oil and is neutralized to remove small amounts of acidic impurities that could develop during the fluorination step. The fluorination procedure is best carried out in the absence of a solvent.

The product of this invention is highly soluble in dimethyl silicone fluids over a broad temperature range of about −60 to 420 degrees Fahrenheit. In addition the incorporation of $C_{10}Cl_4F_{14}$ into dimethyl silicones (Dow-Corning "200" fluid with a viscosity of 50 centistokes at 25 degrees centigrade) as an equal component improves the anti-wear properties of the silicone oil to the point that it is equivalent to that of a synthetic lubricant, such as di-2-ethylhexyl sebacate. It is well known in the art that di-2-ethylhexyl sebacate is used frequently as a base stock in synthetic lubricants.

Prior to the invention of this product it was well known in the art that chlorofluoro compounds impart anti-wear characteristics to silicone oils. The use of chlorofluoro compounds for this purpose has been hindered due to the fact that products that were highly soluble in the silicones at low temperatures were of such a low molecular weight that the mixtures could not be used at elevated temperatures. Chlorofluorocarbons that have boiling points high enough to permit use of the oils at elevated temperatures were not soluble enough at sub-zero temperatures to retain a single phase fluid. $C_{10}Cl_4F_{14}$ overcomes both of the difficulties in one product, namely, it has excellent solubility characteristics over the temperature range of −60 degrees Fahrenheit to above 420 degrees Fahrenheit. In addition its distilling range is such that it will not readily volatilize from the mixture at elevated temperatures.

Silicone oils in general have what are considered to be excellent viscosity characteristics and chlorofluorocarbons in general are considered to have poor viscosity characteristics as compared to silicones. One common method of expressing viscosity characteristics of a hydraulic fluid or lubricant is to report the ASTM slope over the temperature range of 100 degrees Fahrenheit to 210 degrees Fahrenheit. The following table illustrates the fact that the addition of $C_{10}Cl_4F_{14}$ even to the extent of 50 percent does not markedly affect the viscosity slope of the silicon.

Base fluid: ASTM slope 100° F. to 210° F.
Di-2-ethylhexyl sebacate _____ 0.702
Dimethyl silicone (Dow-Corning 200 fluid 50 centistokes at 25° C.) _____ 0.585
50% $C_{10}Cl_4F_{14}$:50% dimethyl silicone _____ 0.606
$C_{10}Cl_4F_{14}$ _____ 0.710

It should be noted that the silicone lowers the viscosity slope of the $C_{10}Cl_4F_{14}$ fluid to a considerable degree. This represents a highly desirable improvement.

$C_{10}Cl_4F_{14}$ is a non-reactive material that can be subjected to prolonged exposure to a variety of chemicals such as chlorine, hydrogen fluoride, nitric acid, chlorosulfonic acid, fluorosulfonic acid, hydrogen chloride, oxygen and chlorine oxides without any deleterious effect. This resistance to chemical attack along with the wide liquid range of the product coupled with its viscosity characteristics at low temperatures makes this an ideal fluid for gages and metering devices handling these reactive chemicals.

The process for the preparation of the starting material used in the preparation of the product of this invention is fully illustrated in Example II given hereinafter. The material is disclosed and claimed in a copending application S.N. 699,438, filed of even date herewith, now U.S. Patent No. 2,951,097, in the name of Samuel Gelfand.

The following examples illustrate methods for the preparation and utility of the compound of this invention; however, they are not to be construed as limiting except as defined in the appended claims.

EXAMPLE I

Preparation $C_{10}Cl_4F_8$ (1,200 grams) prepared as in Example II was charged into a two liter, three-necked round bottom flask equipped with a sealed stirrer, a thermometer, a reflux condenser and heating and/or cooling means. Fifty grams of cobalt trifluoride was added to the reactor and the reaction mixture was heated to 170 to 180 degrees centigrade at which point the cobalt salts changed in color from brown to pink. The mixture was cooled to 120 degrees centigrade, an additional 50 grams of cobalt trifluoride was added, and the resultant mixture was heated to 170 to 180 degrees centigrade. This procedure was repeated until a total of 1600 grams of cobalt trifluoride had been added. At this stage the reaction was not complete, but the reaction mixture contained such a high percent of solids that agitation became inefficient. As a result the reaction mixture after cooling was filtered and the filter cake was extracted twice with hot carbon tetrachloride to recover organic reactant and products. After distillation of the carbon tetrachloride extracts, the recovered $C_{10}Cl_4F_8$ and fluorination products were combined with the filtrate from the reaction mixture (total 1250 grams) and fluorinated as before with an additional 500 grams of cobalt trifluoride. The last cobalt trifluoride did not change from the brown color, this being an indication that the reaction had gone to completion. The organic products were recovered from the reaction mixture in the manner described above, and there was obtained 1200 grams of a colorless oil. This oil was neutralized by stirring with anhydrous sodium carbonate and filtering. The liquid recovered was analyzed and found to distill over a range of about 220 to 235 degrees centigrade and to have a chlorine content of 26.71 percent by weight, a molecular weight of 516 which corresponds to $C_{10}Cl_4F_{14}$ having a chlorine content of 26.9 percent by weight, and a molecular weight of 523 respectively.

EXAMPLE II

Ten moles (2780 grams) of 1,2,3,3-tetrachlorotetrafluorocyclopentene and 370 grams of copper powder were charged into a five liter, three-necked round bottom flask equipped with a sealed stirrer, a thermometer, a reflux condenser and heating and/or cooling means. The reactants were heated to a reflux temperature of about 154 degrees centigrade while maintaining efficient agitation. While the reaction mixture was maintained at reflux by heating, the reaction was continued, with periodic addition of copper powder until a total of 1370 grams had been added. As the reaction proceeded the temperature of the reaction mixture in the liquid phase rose from about 150 degrees centigrade until a final temperature of about 185 degrees centigrade was reached. Thereafter, the reaction mixture was filtered with the major portion of the product being in the filtrate. The residual cake of copper and copper chlorides was extracted twice with hot carbon tetrachloride to recover absorbed starting material and product and the extract was distilled to remove the carbon tetrachloride. The residue from the distillation of the carbon tetrachloride extraction mixture was combined with the filtrate from the reaction mixture and was distilled, to recover unreacted starting material and to isolate the product. An 80 percent yield of a colorless to pale yellow liquid (1218 grams, 3.0 moles) having a boiling point of about 90 degrees centigrade at 1 mm., was obtained. The product solidified on standing. After two recrystallizations from ethanol, colorless needles were obtained, analyzed, and found to possess a melting point range of 74 to 75 degrees centigrade, a chlorine content of 34.5 percent by weight, which corresponds to $C_{10}Cl_4F_8$ having a theoretical chlorine content of 34.3 percent by weight. The infrared spectrum showed absorption characteristic of C=C double bonds at 6.45μ. The ultraviolet spectrum showed peaks at 285,296 mμ, $\epsilon_{296}=41,300$.

EXAMPLE III

A formulation for a base fluid for hydraulic and lubricant applications was prepared containing 50 percent by weight of the compound $C_{10}Cl_4F_{14}$ from Example I and 50 percent by weight of a dimethyl silicone oil (Dow-Corning Silicone "200" fluid with a viscosity of 50 centistokes at 25 degrees centigrade) and was tested in a Shell Four-Ball Tester to determine its wear characteristics. A description of the Shell Four-Ball Tester is disclosed in U.S. Patent 2,019,948. The results of the test are compared in the following table with test data obtained on stock Dow-Corning Silicone "200" fluid with a viscosity of 50 centistokes at 25 degrees centigrade and on a typical dibasic acid ester such as di-2-ethylhexyl sebacate which is a base stock for synthetic lubricants.

TABLE

| Test Fluid | Average Wear Scar Diameter, mm. at load of— | | |
|---|---|---|---|
| | 1 kg. | 10 kg. | 40 kg. |
| Di-2-ethylhexyl Sebacate | 0.26 | 0.55 | 0.69 |
| Dow-Corning Silicone "200" | 0.37 | 0.44 | 1.43 |
| Dow-Corning Silicone "200" K 50 percent $C_{10}Cl_4F_{14}$ | 0.22 | 0.36 | 0.61 |

NOTE.—Wear tests were conducted in the Shell Four-Ball Wear Tester at 75 degrees centigrade, 620 rpm and a one-hour test time using SKF Industries grade one steel ball bearings.

These results show that a fluid consisting of 5 percent of $C_{10}Cl_4F_{14}$ and 50 percent of a dimethyl silicone oil (Dow-Corning Silicone "200" fluid of 50 centistoke viscosity at 25 degrees centigrade) has the wear characteristics of lubricant base fluids derived from dibasic acid esters, e.g., di-2-ethylhexyl sebacate. From the test data it is apparent that the incorporation of the $C_{10}Cl_4F_{14}$ into the formulation has imparted anti-wear properties to the silicone oil that were not present without the $C_{10}Cl_4F_{14}$ fluid.

$C_{10}Cl_4F_{14}$ has other properties that make it useful as a fluid in applications requiring a non-reactive material of wide liquid range that has a viscosity of less than 5000 centistokes at a temperature of −60 degrees Fahrenheit. The viscosity of $C_{10}Cl_4F_{14}$ at a variety of temperatures is as follows:

TABLE

| Temperature, °F.: | Viscosity, centistokes |
|---|---|
| −60 | 3686.0 |
| 100 | 5.02 |
| 160 | 2.25 |
| 210 | 1.47 |

$C_{10}Cl_4F_{14}$ does not react with such reactive materials as chlorine, hydrogen fluoride, nitric acid, chlorosulfonic acid, fluorosulfonic acid, hydrogen chloride, oxygen and chlorine oxides. The fluid can be used in gages and metering equipment handling such chemicals. In addition it is particularly useful in the lubrication of valve stems and packings when they are in use at below zero degrees centigrade in chlorine and hydrogen chloride service.

The viscosity characteristics of $C_{10}Cl_4F_{14}$ are such that it is a useful flotation agent in gyros that are required to function under arctic conditions. $C_{10}Cl_4F_{14}$ is also useful as an additive in other fluids as it is soluble in SAE oil at room temperature to the extent of 25 percent by weight and is soluble in di-2-ethylhexyl sebacate at −10 degrees centigrade to the extent of 50 percent.

This characteristic permits the raising of the flash point of flammable liquids.

It is to be understood that the invention is not limited to the specific examples which have been offered merely as illustrative and that modification may be made within the scope of the appended claim without departing from the spirit of the invention.

We claim:

The process for preparing a halocarbon having an empirical formula $C_{10}Cl_4F_{14}$, and a distillation range of about 220 to 235 degrees centigrade, which comprises: fluorinating a halocarbon having the structural formula

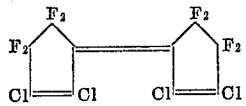

with cobalt trifluoride, at an elevated temperature, and recovering the product so produced.

References Cited in the file of this patent

UNITED STATES PATENTS

| 2,578,720 | McBee et al. | Dec. 18, 1951 |
| 2,654,789 | Ligett | Oct. 6, 1953 |
| 2,668,182 | Miller | Feb. 2, 1954 |

UNITED STATES PATENT OFFICE
CERTIFICATE OF CORRECTION

Patent No. 3,080,429                          March 5, 1963

Charles F. Baranauckas et al.

It is hereby certified that error appears in the above numbered patent requiring correction and that the said Letters Patent should read as corrected below.

Column 4, lines 50 to 59, in the TABLE, first column, line 3 thereof, for "Silicone "200" K 50 percent" read -- Silicone "200" + 50 percent --; same column 4, line 63, for "5 percent" read -- 50 percent --.

Signed and sealed this 22nd day of June 1965.

(SEAL)
Attest:

ERNEST W. SWIDER                          EDWARD J. BRENNER
Attesting Officer                             Commissioner of Patents